US007466742B1

(12) United States Patent
Srinivasan

(10) Patent No.: US 7,466,742 B1
(45) Date of Patent: Dec. 16, 2008

(54) DETECTION OF ENTROPY IN CONNECTION WITH AUDIO SIGNALS

(75) Inventor: Venugopal Srinivasan, Palm Harbor, FL (US)

(73) Assignee: Nielsen Media Research, Inc. DE (US)

( * ) Notice: Subject to any disclaimer, the term of this patent is extended or adjusted under 35 U.S.C. 154(b) by 0 days.

(21) Appl. No.: 09/553,776

(22) Filed: Apr. 21, 2000

(51) Int. Cl.
*H04B 1/00* (2006.01)

(52) U.S. Cl. ...................... 375/132; 375/340; 382/232; 382/233; 382/247; 382/251

(58) Field of Classification Search ................ 375/130, 375/240.12; 382/247, 251, 232, 233; 704/200.1, 704/229, 224; 341/51
See application file for complete search history.

(56) References Cited

U.S. PATENT DOCUMENTS

| | | | | |
|---|---|---|---|---|
| 2,573,279 | A | 10/1951 | Scherbatskoy | 346/37 |
| 2,630,525 | A | 3/1953 | Tomberlin et al. | 250/6 |
| 2,766,374 | A | 10/1956 | Hoffmann | 250/2 |
| 3,004,104 | A | 10/1961 | Hembrooke | 179/2 |
| 3,492,577 | A | 1/1970 | Reiter et al. | 325/31 |
| 3,760,275 | A | 9/1973 | Ohsawa et al. | 325/31 |
| 3,845,391 | A | 10/1974 | Crosby | 325/64 |
| 3,937,882 | A * | 2/1976 | Bingham | 370/276 |
| 4,025,851 | A | 5/1977 | Haselwood et al. | 325/31 |
| 4,225,967 | A | 9/1980 | Miwa et al. | 455/68 |
| 4,238,849 | A | 12/1980 | Gassmann | 370/11 |
| 4,313,197 | A | 1/1982 | Maxemchuk | 370/111 |
| 4,425,642 | A | 1/1984 | Moses et al. | 370/76 |
| 4,512,013 | A | 4/1985 | Nash et al. | 370/69.1 |
| 4,523,311 | A | 6/1985 | Lee et al. | 370/69.1 |
| 4,677,466 | A | 6/1987 | Lert, Jr. et al. | 358/84 |
| 4,697,209 | A | 9/1987 | Kiewit et al. | 358/84 |
| 4,703,476 | A | 10/1987 | Howard | 370/76 |
| 4,750,173 | A | 6/1988 | Blüthgen | 370/111 |
| 4,771,455 | A | 9/1988 | Hareyama et al. | 380/6 |
| 4,876,617 | A | 10/1989 | Best et al. | 360/60 |
| 4,931,871 | A | 6/1990 | Kramer | 358/142 |
| 4,943,973 | A | 7/1990 | Werner | 375/1 |
| 4,945,412 | A | 7/1990 | Kramer | 358/142 |
| 4,972,471 | A | 11/1990 | Gross et al. | 380/3 |
| 5,113,437 | A * | 5/1992 | Best et al. | 380/253 |

(Continued)

FOREIGN PATENT DOCUMENTS

DE 43 16 297 4/1994

(Continued)

OTHER PUBLICATIONS

"Digital Audio Watermarking," Audio Media, Jan./Feb. 1998, pp. 56, 57, 59 and 61.

(Continued)

*Primary Examiner*—Curtis B Odom
(74) *Attorney, Agent, or Firm*—Hanley, Flight & Zimmerman, LLC.

(57) ABSTRACT

An encoder calculates an entropy of at least a portion of a signal and encodes the signal with the calculated entropy. A decoder decodes the signal in order to recover the encoded entropy. The decoder may also determine an entropy of the signal and may compare the entropy that it determines to the decoded entropy. The decoder detects compression/decompression based upon results from the comparison, and/or the decoder prevents use of a device based upon results from the comparison.

13 Claims, 8 Drawing Sheets

U.S. PATENT DOCUMENTS 5,213,337 A 5/1993 Sherman ..................... 273/439
5,319,735 A 6/1994 Preuss et al. ............... 395/2.14
5,379,345 A 1/1995 Greenberg ................... 380/23
5,394,274 A 2/1995 Kahn .......................... 360/27
5,404,377 A 4/1995 Moses ........................ 375/200
5,450,490 A 9/1995 Jensen et al. ................... 380/6
5,473,631 A 12/1995 Moses ........................ 375/202
5,574,962 A 11/1996 Fardeau et al. ................. 455/2
5,579,124 A 11/1996 Aijala et al. .................. 386/96
5,581,800 A 12/1996 Fardeau et al. ................. 455/2
5,594,934 A 1/1997 Lu et al. ........................ 455/2
5,629,739 A 5/1997 Dougherty .................. 348/486
5,652,581 A * 7/1997 Furlan et al. .................. 341/51
5,687,191 A 11/1997 Lee et al. .................... 375/216
5,764,763 A 6/1998 Jensen et al. ................... 380/6
5,778,339 A * 7/1998 Sonohara et al. ............ 704/224
5,787,334 A 7/1998 Fardeau et al. ................. 455/2
5,822,360 A 10/1998 Lee et al. .................... 375/200
5,832,119 A 11/1998 Rhoads ....................... 382/232
5,899,970 A * 5/1999 Sonohara .................... 704/229
5,930,369 A 7/1999 Cox et al. ..................... 380/54
6,035,177 A 3/2000 Moses et al. ................... 455/2
6,167,160 A * 12/2000 Osawa ........................ 382/247
6,298,160 B1 * 10/2001 Goertzen .................... 382/232
6,313,932 B1 * 11/2001 Roberts et al. ................. 398/9
6,363,175 B1 * 3/2002 Scheirer et al. ............. 382/232
6,421,445 B1 * 7/2002 Jensen et al. ................ 380/253
6,470,042 B1 * 10/2002 Tani et al. ................... 375/132
6,535,845 B2 * 3/2003 Van Der Vleuten et al. . 704/219
7,111,094 B1 * 9/2006 Liu et al. ...................... 710/65

FOREIGN PATENT DOCUMENTS

| | | |
|---|---|---|
| EP | 0 243 561 | 11/1987 |
| EP | 0 535 893 | 4/1993 |
| GB | 2 170 080 | 7/1986 |
| GB | 2 260 246 | 4/1993 |
| GB | 2 292 506 | 2/1996 |
| JP | 07 059030 | 3/1995 |
| JP | 09 009213 | 1/1997 |
| WO | WO 89/09985 | 10/1989 |
| WO | WO 93/07689 | 4/1993 |
| WO | WO 94/11989 | 5/1994 |

OTHER PUBLICATIONS

International Search Report, dated Aug. 27, 1999, Application No. PCT/US98/23558.

Namba. S. et al., "A Program Identification Code Transmission System Using Low-Frequency Audio Signals," NHK Laboratories Note, Ser. No. 314, Mar. 1985.

Steele, R. et al., "Simultaneous Transmission of Speech and Data Using Code-Breaking Techniques," The Bell System Tech. Jour., vol. 60, No. 9, pp. 2081-2105, Nov. 1981.

International Search Report, dated Aug. 18, 2000, Application No. PCT/US00/03829.

* cited by examiner

DETECTION OF ENTROPY IN CONNECTION WITH AUDIO SIGNALS

RELATED APPLICATION

This application contains disclosure similar to the disclosure in U.S. patent application Ser. No. 09/116,397 filed Jul. 16, 1998, in U.S. patent application Ser. No. 09/427,970 filed Oct. 27, 1999, in U.S. patent application Ser. No. 09/428,425 filed Oct. 27, 1999, and in U.S. patent application Ser. No. 09/543,480 filed Apr. 6, 2000.

TECHNICAL FIELD OF THE INVENTION

The present invention relates to the encoding, decoding, and use of entropy in connection with the transmission of signals.

BACKGROUND OF THE INVENTION

The video and/or audio received by video and/or audio receivers are monitored for a variety of reasons. For example, such monitoring has been used to detect when copyrighted video and/or audio has been transmitted so that appropriate royalty calculations can be made. Other examples of the use of such monitoring include determining whether a receiver is authorized to receive the video and/or audio, and determining the sources or identities of video and/or audio.

One approach to monitoring video and/or audio is to add ancillary codes to the video and/or audio at the time of transmission or recording and to detect and decode the ancillary codes at the time of receipt by a receiver or at the time of performance by a player. There are many arrangements for adding an ancillary code to video and/or audio in such a way that the added ancillary code is not noticed when the video is viewed on a monitor and/or when the audio is supplied to speakers. For example, it is well known in television broadcasting to hide such ancillary codes in non-viewable portions of video by inserting them into either the video's vertical blanking interval or horizontal retrace interval. An exemplary system which hides ancillary codes in non-viewable portions of video is referred to as "AMOL" and is taught in U.S. Pat. No. 4,025,851.

Other known video encoding systems have sought to bury the ancillary code in a portion of a video signal's transmission bandwidth that otherwise carries little signal energy. An example of such a system is disclosed by Dougherty in U.S. Pat. No. 5,629,739.

An advantage of adding an ancillary code to audio is that the ancillary code can be detected in connection with radio transmissions and with pre-recorded music as well as in connection with television transmissions. Moreover, ancillary codes, which are added to audio signals, are reproduced in the audio signal output of a speaker and, therefore, offer the possibility of non-intrusive interception and decoding with equipment that has a microphone as an input. Thus, the reception and/or playing of audio can be monitored by the use of portable metering equipment.

One known audio encoding system is disclosed by Crosby, in U.S. Pat. No. 3,845,391. In this system, an ancillary code is inserted in a narrow frequency "notch" from which the original audio signal is deleted. The notch is made at a fixed predetermined frequency (e.g., 40 Hz). This approach led to ancillary codes that were audible when the original audio signal containing the ancillary code was of low intensity.

A series of improvements followed the Crosby patent. Thus, Howard, in U.S. Pat. No. 4,703,476, teaches the use of two separate notch frequencies for the mark and the space portions of a code signal. Kramer, in U.S. Pat. No. 4,931,871 and in U.S. Pat. No. 4,945,412 teaches, inter alia, using a code signal having an amplitude that tracks the amplitude of the audio signal to which the ancillary code is added.

Microphone-equipped audio monitoring devices that can pick up and store inaudible ancillary codes transmitted in an audio signal are also known. For example, Aijalla et al., in WO 94/11989 and in U.S. Pat. No. 5,579,124, describe an arrangement in which spread spectrum techniques are used to add an ancillary code to an audio signal so that the ancillary code is either not perceptible, or can be heard only as low level "static" noise. Also, Jensen et al., in U.S. Pat. No. 5,450,490, teach an arrangement for adding an ancillary code at a fixed set of frequencies and using one of two masking signals, where the choice of masking signal is made on the basis of a frequency analysis of the audio signal to which the ancillary code is to be added.

Moreover, Preuss et al., in U.S. Pat. No. 5,319,735, teach a multi-band audio encoding arrangement in which a spread spectrum ancillary code is inserted in recorded music at a fixed ratio to the input signal intensity (code-to-music ratio) that is preferably 19 dB. Lee et al., in U.S. Pat. No. 5,687,191, teach an audio coding arrangement suitable for use with digitized audio signals in which the code intensity is made to match the input signal by calculating a signal-to-mask ratio in each of several frequency bands and by then inserting the code at an intensity that is a predetermined ratio of the audio input in that band. As reported in this patent, Lee et al. have also described a method of embedding digital information in a digital waveform in pending U.S. application Ser. No. 08/524,132.

It will be recognized that, because ancillary codes are preferably inserted at low intensities in order to prevent the ancillary code from distracting a listener of program audio, such ancillary codes may be vulnerable to various signal processing operations. For example, although Lee et al. discuss digitized audio signals, it may be noted that many of the earlier known approaches to encoding an audio signal are not compatible with current and proposed digital audio standards, particularly those employing signal compression methods that may reduce the signal's dynamic range (and thereby delete a low level ancillary code) or that otherwise may damage an ancillary code. In many applications, it is particularly important for an ancillary code to survive compression and subsequent de-compression by such algorithms as the AC-3 algorithm or the algorithms recommended in the ISO/IEC 11172 MPEG standard, which is expected to be widely used in future digital television transmission and reception systems.

It must also be recognized that the widespread availability of devices to store and transmit copyright protected digital music and images has forced owners of such copyrighted materials to seek methods to prevent unauthorized copying, transmission, and storage of their material. Unlike the analog domain, where repeated copying of music and video stored on media, such as tapes, results in a degradation of quality, digital representations can be copied without any loss of quality. The main constraints preventing illegal reproductions of copyrighted digital material is the large storage capacity and transmission bandwidth required for performing these operations. However, data compression algorithms have made the reproduction of digital material possible.

A popular compression technology known as MP3 can compress original audio stored as digital files by a factor of ten. When decompressed the resulting digital audio is virtually indistinguishable from the original. From a single compressed MP3 file, any number of identical digital audio files can be created. Currently, portable devices that can store audio in the form of MP3 files and play these files after decompression are available.

In order to protect copyrighted material, digital code inserting techniques have been developed where ancillary codes can be inserted into audio as well as video digital data streams. The ancillary codes are used as digital signatures to uniquely identify a piece of music or an image. As discussed above, many methods for embedding such imperceptible ancillary codes in both audio and video data are currently available. While such ancillary codes provide proof of ownership, there exists a need for the prevention of distribution of illegally reproduced versions of digital music and video.

In an effort to satisfy this need, it has been proposed to use two separate ancillary codes that are periodically embedded in an audio stream. For example, it is suggested that the ancillary codes be embedded in the audio stream at least once every 15 seconds. The first ancillary code is a "robust" ancillary code that is present in the audio even after it has been subjected to fairly severe compression and decompression. A two-channel or stereo digital audio stream in its original form may carry data at a rate of 1.5 megabits/second. A compressed version of this stream may have a data rate of 96 kilobits/second. This reduction in data rate is achieved by means of "lossy compression" algorithms. In this approach, the inability of the human ear to detect the presence of a low power frequency when there is a neighboring high power frequency is exploited to modify the number of bits used to represent each spectral value. Yet the audio recovered by decompressing the latter will still carry the robust ancillary code.

The second ancillary code is a "fragile" ancillary code that is also embedded in the original audio. This second ancillary code is erased during the compression/decompression operation. The robust ancillary code contains a specific bit that, if set, instructs the software in a compliant player to perform a search for the "fragile" ancillary code and, if not set, to allow the music to be played without such a search. If the compliant player is instructed to search for the presence of the fragile ancillary code, and if the fragile ancillary code cannot be detected by the compliant player, the compliant player will not play the music.

Additional bits in the robust ancillary code also determine whether copies of the music can be made. In all, twelve bits of data constitute an exemplary robust ancillary code and are arranged in a specified bit structure.

A problem with the "fragile" ancillary code is that it is fragile and may be difficult to receive even when there is no unauthorized compression/decompression. Accordingly, one embodiment of the present invention is directed to a pair of robust ancillary codes useful in detecting unauthorized compression. The first ancillary code consists of twelve-bits conforming to the specified bit structure discussed above, and the second ancillary code consists of thirteen-bits forming a descriptor that characterizes a part of the audio signal in which the ancillary codes are embedded. In a player designed to detect compression, both of the ancillary codes are extracted irrespective of whether or not the audio material has been subjected to a compression/decompression operation. The detector in the player independently computes a thirteen-bit descriptor for the received audio and compares this computed thirteen-bit descriptor to the embedded thirteen-bit descriptor. Any difference that exceeds a threshold will generate a screening trigger indicating unauthorized compression. The descriptor used in the proposed method is based on entropy calculations and shows a significant change when any modifications to the original audio are made.

SUMMARY OF THE INVENTION

According to one aspect of the present invention, an encoder has an input and an output. The input receives a signal. The encoder calculates an entropy of at least a portion of the signal and encodes the signal with the calculated entropy. The output carries the encoded signal.

According to another aspect of the present invention, a decoder has an input and an output. The input receives a signal. The decoder decodes the signal so as to read an entropy code from the signal. The output carries a signal based upon the decoded entropy code.

According to still another aspect of the present invention, a method of encoding a signal comprises the following steps: a) calculating an entropy of at least a portion of the signal; and, b) encoding the signal with the calculated entropy.

According to yet another aspect of the present invention, a method of decoding a signal comprises the following steps: a) decoding the signal so as to read a calculated entropy code from the signal; and, b) providing an output based upon the decoded calculated entropy.

According to a further aspect of the present invention, an electrical signal contains an entropy code related to an entropy of the electrical signal.

BRIEF DESCRIPTION OF THE DRAWING

These and other features and advantages will become more apparent from a detailed consideration of the invention when taken in conjunction with the drawings in which.

DETAILED DESCRIPTION OF THE INVENTION

Figure 1:
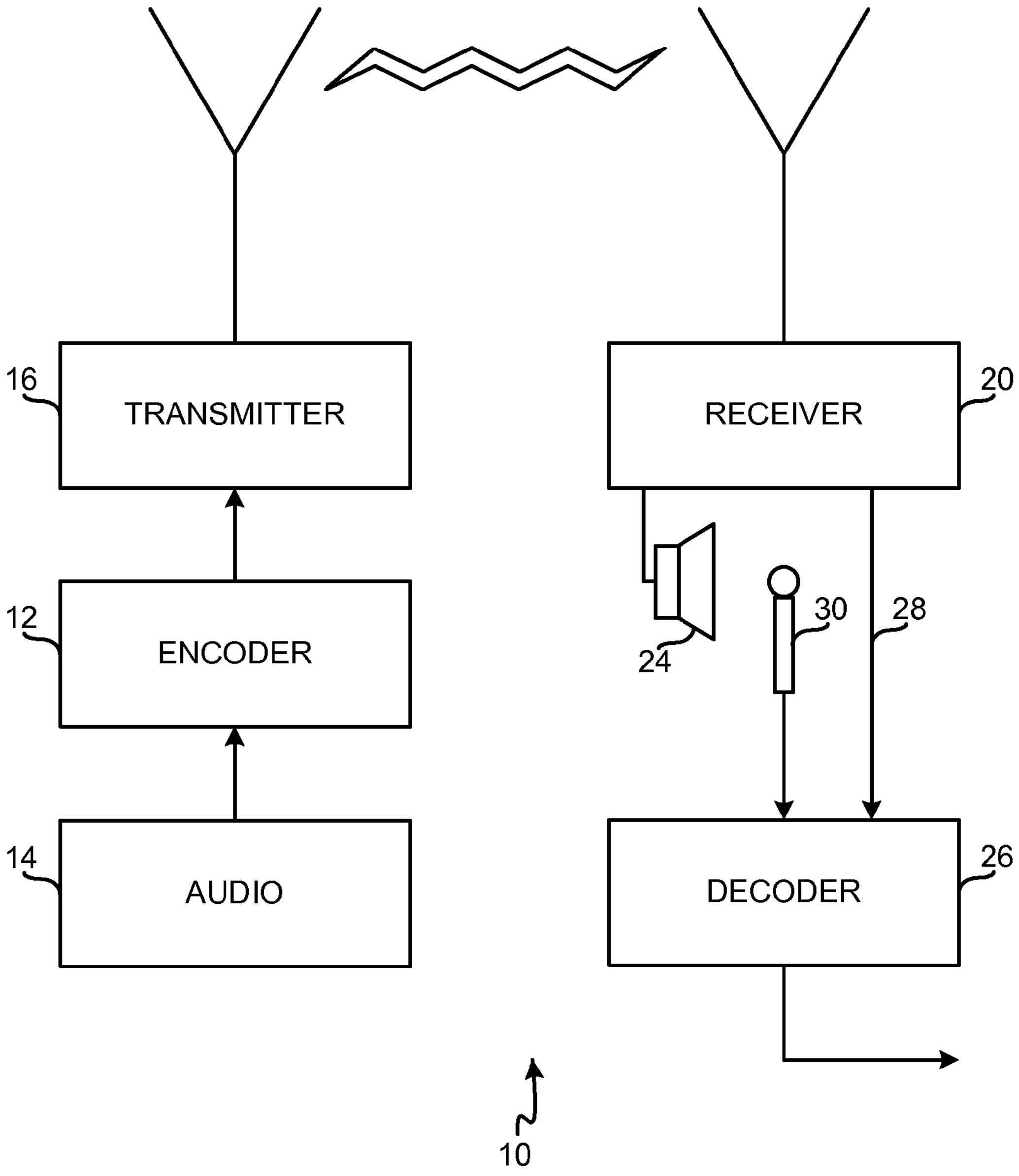
FIG. 1 is a schematic block diagram of a monitoring system employing the signal coding and decoding techniques of the present invention.

Audio signals are usually digitized at sampling rates that range between thirty-two kHz and forty-eight kHz. For example, a sampling rate of 44.1 kHz is commonly used during the digital recording of music. However, digital television ("DTV") is likely to use a forty eight kHz sampling rate. Besides the sampling rate, another parameter of interest in digitizing an audio signal is the number of binary bits used to represent the audio signal at each of the instants when it is sampled. This number of binary bits can vary, for example, between sixteen and twenty four bits per sample. The amplitude dynamic range resulting from using sixteen bits per sample of the audio signal is ninety-six dB. This decibel measure is the ratio between the square of the highest audio amplitude ($2^{16}$=65536) and the lowest audio amplitude ($1^2$=1). The dynamic range resulting from using twenty-four bits per sample is 144 dB. Raw audio, which is sampled at the 44.1 kHz rate and which is converted to a sixteen-bit per sample representation, results in a data rate of 705.6 kbits/s.

Compression of audio signals is performed in order to reduce this data rate to a level which makes it possible to transmit a stereo pair of such data on a channel with a throughput as low as 192 kbits/s. This compression typically is accomplished by transform coding. A block consisting of $N_d$=1024 samples, for example, may be decomposed, by application of a Fast Fourier Transform or other similar frequency analysis process, into a spectral representation. In order to prevent errors that may occur at the boundary between one block and the previous or subsequent block, overlapped blocks are commonly used. In one such arrangement where 1024 samples per overlapped block are used, a block includes 512 samples of "old" samples (i.e., samples from a previous block) and 512 samples of "new" or current samples. The spectral representation of such a block is divided into critical bands where each band comprises a group of several neighboring frequencies. The power in each of these bands can be calculated by summing the squares of the amplitudes of the frequency components within the band.

Audio compression is based on the principle of masking that, in the presence of high spectral energy at one frequency (i.e., the masking frequency), the human ear is unable to perceive a lower energy signal if the lower energy signal has a frequency (i.e., the masked frequency) near that of the higher energy signal. The lower energy signal at the masked frequency is called a masked signal. A masking threshold, which represents either (i) the acoustic energy required at the masked frequency in order to make it audible or (ii) an energy change in the existing spectral value that would be perceptible, can be dynamically computed for each band. The frequency components in a masked band can be represented in a coarse fashion by using fewer bits based on this masking threshold. That is, the masking thresholds and the amplitudes of the frequency components in each band are coded with a smaller number of bits which constitute the compressed audio. Decompression reconstructs the original signal based on this data.

FIG. 1 illustrates an audio encoding system 10 in which an encoder 12 adds an ancillary code to an audio signal 14 to be transmitted or recorded. Alternatively, the encoder 12 may be provided, as is known in the art, at some other location in the signal distribution chain. A transmitter 16 transmits the encoded audio signal 14. The encoded signal 14 can be transmitted over the air, over cables, by way of satellites, over the Internet or other network, or the like. When the encoded signal is received by a receiver 20, suitable processing is employed to recover the ancillary code from the audio signal 14 even though the presence of that ancillary code is imperceptible to a listener when the encoded audio signal 14 is supplied to speakers 24 of the receiver 20. To this end, a decoder 26 is included within the receiver 20 or, as shown in FIG. 1, is connected either directly to an audio output 28 available at the receiver 20 or to a microphone 30 placed in the vicinity of the speakers 24 through which the audio is reproduced. The received audio signal 14 can be either in a monaural or stereo format.

Encoding by Spectral Modulation

Figure 2:
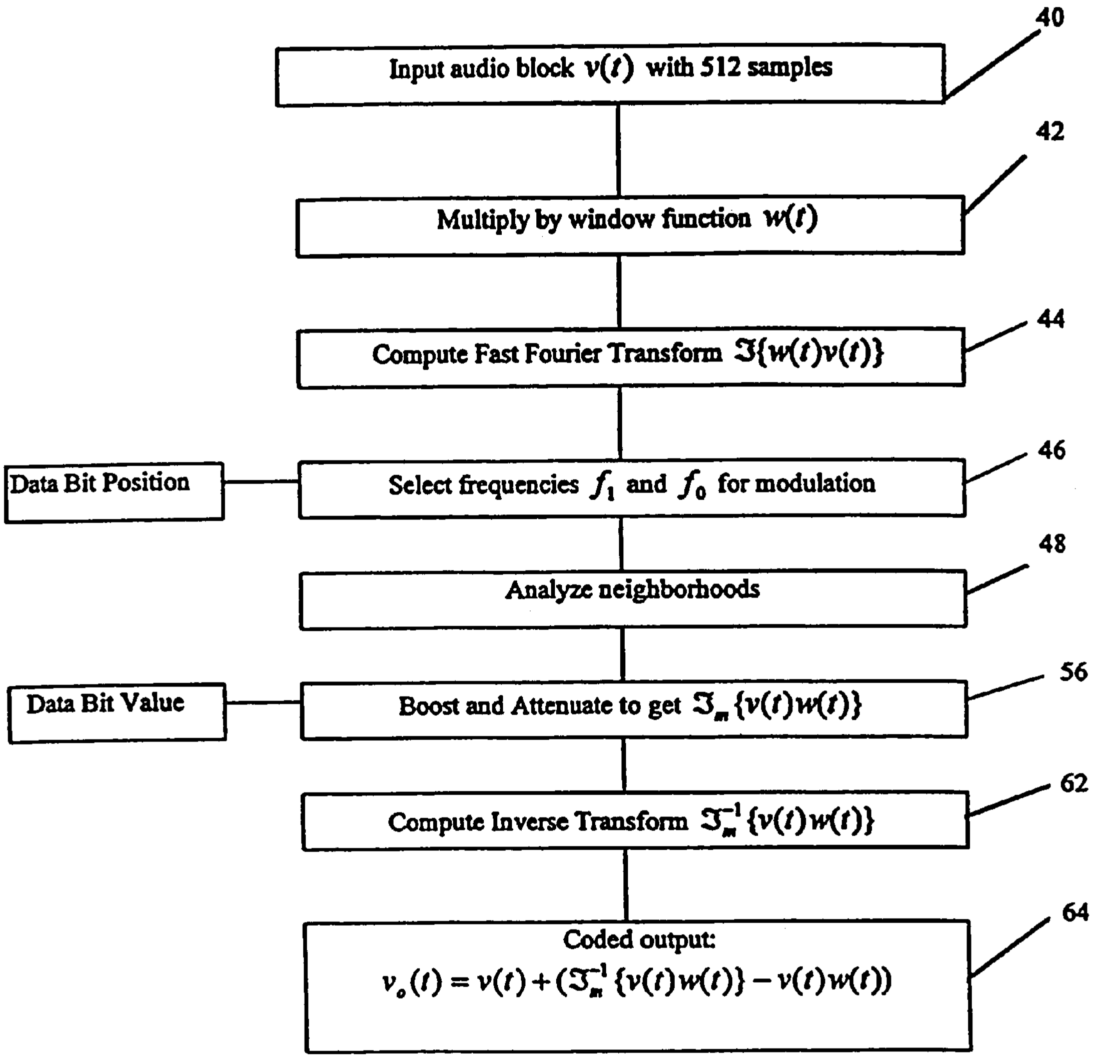
FIG. 2 is flow chart depicting steps performed by the encoder of the system shown in FIG. 1.

In order for the encoder 12 to embed a "robust" digital ancillary code in an audio data stream in a manner compatible with compression technology, the encoder 12 should preferably use frequencies and critical bands that match those used in compression. The block length $N_C$ of the audio signal that is used for coding may be chosen such that, for example, $jN_C=N_d=1024$, where j is an integer. A suitable value for $N_C$ may be, for, example, 512. As depicted by a step 40 of the flow chart show n in FIG. 2, which is executed by the encoder 12, a first block v(t) of $N_C$ samples is derived from the audio signal 14 by the encoder 12 such as by use of an analog to digital converter, where v(t) is the time-domain representation of the audio signal within the block. An optional window may be applied to v(t) at a block 42 as discussed below in additional detail. Assuming for the moment that no such window is used, a Fourier Transform $\Im\{v(t)\}$ of the block v(t) to be coded is computed at a step 44. (The Fourier Transform implemented at the step 44 may be a Fast Fourier Transform.)

The frequencies resulting from the Fourier Transform are indexed in the range −256 to +255, where an index of 255 corresponds to exactly half the sampling frequency $f_S$. Therefore, for a forty-eight kHz sampling frequency, the highest index would correspond to a frequency of twenty-four kHz. Accordingly, for purposes of this indexing, the index closest to a particular frequency component $f_j$ resulting from the Fourier Transform $\Im\{v(t)\}$ is given by the following equation:

$$I_j = \left(\frac{255}{24}\right)\cdot f_j \tag{1}$$

where equation (1) is used in the following discussion to relate a frequency $f_j$ and its corresponding index $I_j$.

The code frequencies $f_i$ used for coding a block may be chosen from the Fourier Transform $\Im\{v(t)\}$ at a step 46 in a particular frequency range, such as the range of 4.8 kHz to 6 kHz, which may be chosen to exploit the higher auditory threshold in this band. Also, each successive bit of the code may use a different pair of code frequencies $f_1$ and $f_0$ denoted by corresponding code frequency indexes $I_1$ and $I_0$. There are two preferred ways of selecting the code frequencies $f_1$ and $f_0$ at the step 46 so as to create an inaudible wide-band noise like code, although other ways of selecting the code frequencies $f_1$ and $f_0$ could be used.

(a) Direct Sequence

One way of selecting the code frequencies $f_1$ and $f_0$ at the step 46 is to compute the code frequencies by use of a frequency hopping algorithm employing a hop sequence $H_S$ and a shift index $I_{shift}$. For example, if $N_s$ bits are grouped together to form a pseudo-noise sequence, $H_S$ is an ordered sequence of $N_s$ numbers representing the frequency deviation relative to a predetermined reference index $I_{5k}$. For the case where $N_s$=7, a hop sequence $H_S$={2,5,1,4,3,2,5} and a shift index $I_{shift}$=5, for example, could be used. In general, the indices for the $N_s$ bits resulting from a hop sequence may be given by the following equations:

$$I_1=I_{5k}+H_s-I_{shift} \tag{2}$$

and $$I_0=I_{5k}+H_s+I_{shift} \tag{3}$$

one possible choice for the reference frequency $f_{5k}$ is five kHz, for example, which corresponds to a predetermined reference index $I_{5k}$=53. This value of $f_{5k}$ is chosen because it is above the average maximum sensitivity frequency of the human ear. When encoding a first block of the audio signal with a first bit, $I_1$ and $I_0$ for the first block are determined from equations (2) and (3) using a first of the hop sequence numbers; when encoding a second block of the audio signal with a second bit, $I_1$ and $I_0$ for the second block are determined from equations (2) and (3) using a second of the hop sequence numbers; and so on. For the fifth bit in the sequence {2,5,1, 4,3,2,5}, for example, the hop sequence value is three and, using equations (2) and (3), produces an index $I_1$=51 and an index $I_0$=61 in the case where $I_{shift}$=5. In this example, the mid-frequency index is given by the following equation:

$$I_{mid}=I_{5k}+3=56 \tag{4}$$

where $I_{mid}$ represents an index mid-way between the code frequency indices $I_1$ and $I_0$. Accordingly, each of the code frequency indices is offset from the mid-frequency index by the same magnitude, $I_{shift}$, but the two offsets have opposite signs.

(b) Hopping Based on Low Frequency Maximum

Another way of selecting the code frequencies at the step 46 is to determine a frequency index $I_{max}$ at which the spectral power of the audio signal, as determined at the step 44, is a maximum in the low frequency band extending from zero Hz to two kHz. In other words, $I_{max}$ is the index corresponding to the frequency having maximum power in the range of 0-2 kHz. It is useful to perform this calculation starting at index 1, because index 0 represents the "local" DC component and may be modified by high pass filters used in compression. The code frequency indices $I_1$ and $I_0$ are chosen relative to the frequency index $I_{max}$ so that they lie in a higher frequency band at which the human ear is relatively less sensitive. Again, one possible choice for, the reference frequency $f_{5k}$ is five kHz corresponding to a reference index $I_{5k}$=53 such that $I_1$ and $I_0$ are given by the following equations:

$$I_1=I_{5k}+I_{max}-I_{shift} \tag{5}$$

and $$I_0=I_{5k}+I_{max}+I_{shift} \tag{6}$$

where $I_{shift}$ is a shift index, and where $I_{max}$ varies according to the spectral power of the audio signal. An important observation here is that a different set of code frequency indices $I_1$ and $I_0$ from input block to input block is selected for spectral modulation depending on the frequency index $I_{max}$ of the corresponding input block. In this case, a code bit is coded as a single bit: however, the frequencies that are used to encode each bit hop from block to block.

Unlike many traditional coding methods, such as Frequency Shift Keying (FSK) or Phase Shift Keying (PSK), the present invention does not rely on a single fixed frequency. Accordingly, a "frequency-hopping" effect is created similar to that seen in spread spectrum modulation systems. However, unlike-=spread spectrum, the object of varying the coding frequencies of the present invention is to avoid the use of a constant code frequency which may render it audible.

For either of the two code frequencies selection approaches (a) and (b) described above, there are at least four modulation methods that can be implemented at a step 56 in order to encode a binary bit of data in an audio block, i.e., amplitude modulation, modulation by frequency swapping, phase modulation, and odd/even index modulation. These four methods of modulation are separately described below.

(i) Amplitude Modulation

In order to code a binary '1' using amplitude modulation, the spectral power at $I_1$ is increased to a level such that it constitutes a maximum in its corresponding neighborhood of frequencies. The neighborhood of indices corresponding to this neighborhood of frequencies is analyzed at a step 48 in order to determine how much the code frequencies $f_1$ and $f_0$ must be boosted and attenuated, respectively, so that they are detectable by the decoder 26. For index $I_1$, the neighborhood may preferably extend from $I_1-2$ to $I_1+2$, and is constrained to cover a narrow enough range of frequencies that the neighborhood of $I_1$ does not overlap the neighborhood of $I_0$. Simultaneously; the spectral power at $I_0$ is modified in order to make it a minimum in its neighborhood of indices ranging from $I_0-2$ to $I_0+2$. Conversely, in order to code a binary '0' using amplitude modulation, the power at $I_1$ is attenuated and the power at $I_0$ is increased in their corresponding neighborhoods.

Figure 3:
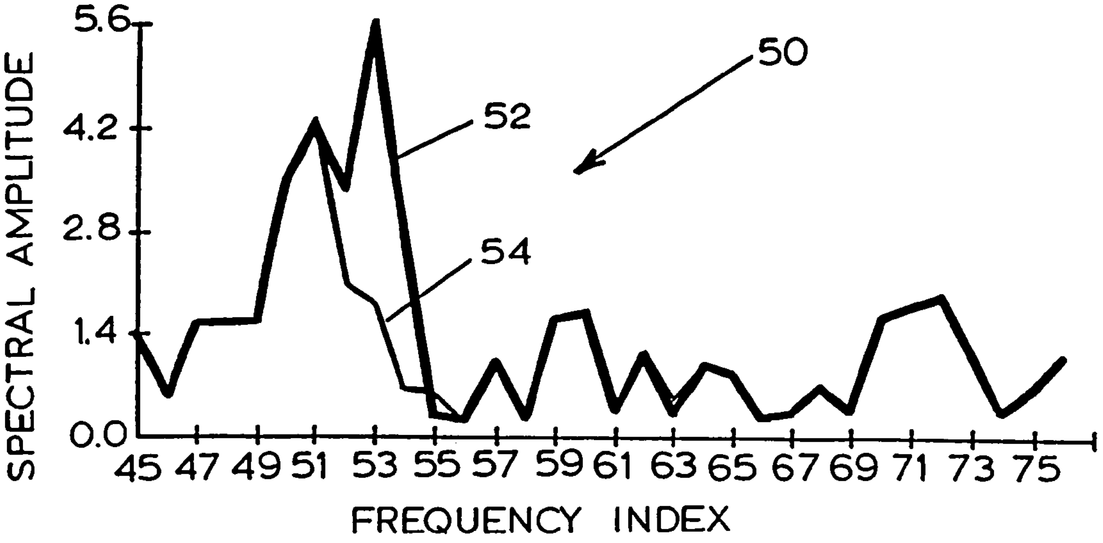
FIG. 3 is a spectral plot of an audio block, wherein the thin line of the plot is the spectrum of the original audio signal and the thick line of the plot is the spectrum of the signal modulated in accordance with the present invention.

As an example, FIG. 3 shows a typical spectrum 50 of an $N_c$ sample audio block plotted over a range of frequency index from forty five to seventy seven. A spectrum 52 shows the audio block after coding of a '1' bit, and a spectrum 54 shows the audio block before coding. In this particular instance of encoding a '1' bit according to code frequency selection approach (a), the hop sequence value is five which yields a mid-frequency index of fifty eight. The values for $I_1$ and $I_0$ are fifty three and sixty three, respectively. The spectral amplitude at fifty three is then modified at a step 56 of FIG. 2 in order to make it a maximum within its neighborhood of indices. The amplitude at sixty three already constitutes a minimum and, therefore, only a small additional attenuation is applied at the step 56.

The spectral power modification process requires the computation of four values each in the neighborhood of $I_1$ and $I_0$. For the neighborhood of $I_1$ these four values are as follows: (1) $I_{max1}$ which is the index of the frequency in the neighborhood of $I_1$ having maximum power; (2) $P_{max1}$ which is the spectral power at $I_{max1}$; (3) $I_{min1}$ which is the index of the frequency in the neighborhood of $I_1$ having minimum power; and (4) $P_{min1}$ which is the spectral power at $I_{min1}$. Corresponding values for the $I_0$ neighborhood are $I_{max0}$, $P_{max0}$, $I_{min0}$, and $P_{min0}$.

If $I_{max1}=I_1$, and if the binary value to be coded is a '1', only a token increase in $P_{max1}$ (i.e., the power at $I_1$) is required at the step 56. Similarly, if $I_{min0}=I_0$, then only a token decrease in $P_{max0}$ (i.e., the power at $I_0$) is required at the step 56. When $P_{max1}$ is boosted, it is multiplied by a factor 1+A at the step 56, where A is in the range of about 1.5 to about 2.0. The choice of A is based on experimental audibility tests combined with compression survivability tests. The condition for imperceptibility requires a low value for A, whereas the condition for compression survivability requires a large value for A. A fixed value of A may not lend itself to only a token increase or decrease of power. Therefore, a more logical choice for A would be a value based on the local masking threshold. In this case, A is variable, and coding can be achieved with a minimal incremental power level change and yet survive compression.

In either case, the spectral power at $I_1$ is given by the following equation:

$$P_{I1}=(1+A)\cdot P_{max1} \tag{7}$$

with suitable modification of the real and imaginary parts of the frequency component at $I_1$. The real and imaginary parts are multiplied by the same factor in order to keep the phase angle constant. The power at $I_0$ is reduced to a value corresponding to $(1+A)^{-1} P_{min0}$ in a similar fashion.

The Fourier Transform of the block to be coded as determined at the step 44 also contains negative frequency components with indices ranging in index values from −256 to −1. Spectral amplitudes at frequency indices $-I_1$ and $-I_0$ must be set to values representing the complex conjugate of amplitudes at $I_1$ and $I_0$, respectively, according to the following equations:

$$Re[f(-I_1)]=Re[f(I_1)] \quad (8)$$

$$Im[f(-I_1)]=-Im[f(I_1)] \quad (9)$$

$$Re[f(-I_0)]=Re[f(I_0)] \quad (10)$$

$$Im[f(-I_0)]=-Im[f(I_0)] \quad (11)$$

where f(I) is the complex spectral amplitude at index I.

Compression algorithms based on the effect of masking, modify the amplitude of individual spectral components by means of a bit allocation algorithm. Frequency bands subjected to a high level of masking by the presence of high spectral energies in neighboring bands are assigned fewer bits, with the result that their amplitudes are coarsely quantized. However, the decompressed audio under most conditions tends to maintain relative amplitude levels at frequencies within a neighborhood. The selected frequencies in the encoded audio stream which have been amplified or attenuated at the step 56 will, therefore, maintain their relative positions even after a compression/decompression process.

It may happen that the Fourier Transform $\Im\{v(t)\}$ of a block may not result in a frequency component of sufficient amplitude at the frequencies $f_1$ and $f_0$ to permit encoding of a bit by boosting the power at the appropriate frequency. In this event, it is preferable not to encode this block and to instead encode a subsequent block where the power of the signal at the frequencies $f_1$ and $f_0$ is appropriate for encoding.

(ii) Modulation by Frequency Swapping

In this approach, which is a variation of the amplitude, modulation approach described above in section (i), the spectral amplitudes at $I_1$ and $I_{max1}$ are swapped when encoding a one bit while retaining the original phase angles at $I_1$ and $I_{max1}$. A similar swap between the spectral amplitudes at $I_0$ and $I_{max0}$ is also performed. When encoding a zero bit, the roles of $I_1$ and $I_0$ are reversed as in the case of amplitude modulation. As in the previous case, swapping is also applied to the corresponding negative frequency indices. This encoding approach results in a lower audibility level because the encoded signal undergoes only a minor frequency distortion. Both the unencoded and encoded signals have identical energy values.

(iii) Phase Modulation

The phase angle associated with a spectral component $I_0$ is given by the following equation:

$$\phi_0 = \tan^1 \frac{\mathrm{Im}[f(I_0)]}{\mathrm{Re}[f(I_0)]} \quad (12)$$

where $0 \leqq \Phi_0 \leqq 2\pi$. The phase angle associated with $I_1$ can be computed in a similar fashion. In order to encode a binary number, the phase angle of one of these components, usually the component with the lower spectral amplitude, can be modified to be either in phase (i.e., $0^0$) or out of phase (i.e., 180°) with respect to the other component, which becomes the reference. In this manner, a binary 0 may be encoded as an in-phase modification and a binary 1 encoded as an out-of-phase modification. Alternatively, a binary 1 may be encoded as an in-phase modification and a binary 0 encoded as an out-of-phase modification. The phase angle of the component that is modified is designated $\phi_M$, and the phase angle of the other component is designated $\phi_R$. Choosing the lower amplitude component to be the modifiable spectral component minimizes the change in the original audio signal.

In order to accomplish this form of modulation, one of the spectral components may have to undergo a maximum phase change of 180°, which could make the code audible. In practice, however, it is not essential to perform phase modulation to this extent, as it is only necessary to ensure that the two components are either "close" to one another in phase or "far" apart. Therefore, at the step 48, a phase neighborhood extending over a range of $\pm\pi/4$ around $\phi_R$, the reference component, and another neighborhood extending over a range of $\pm\pi/4$ around $\phi_R+\pi$ may be chosen. The modifiable spectral component has its phase angle $\phi_M$ modified at the step 56 so as to fall into one of these phase neighborhoods depending upon whether a binary '0' or a binary '1' is being encoded. If a modifiable spectral component is already in the appropriate phase neighborhood, no phase modification may be necessary. In typical audio streams, approximately 30% of the segments are "self-coded" in this manner and no modulation is required. The inverse Fourier Transform is determined at the step 62.

(iv) Odd/Even Index Modulation

In this odd/even index modulation approach, a single code frequency index, $I_1$, selected as in the case of the other modulation schemes, is used. A neighborhood defined by indexes $I_1$, $I_1+1$, $I_1+2$, and $I_1+3$, is analyzed to determine whether the index $I_M$ corresponding to the spectral component having the maximum power in this neighborhood is odd or even. If the bit to be encoded is a '1' and the index $I_M$ is odd, then the block being coded is assumed to be "auto-coded." Otherwise, an odd-indexed frequency in the neighborhood is selected for amplification in order to make it a maximum. A bit '0' is coded in a similar manner using an even index. In the neighborhood consisting of four indexes, the probability that the parity of the index of the frequency with maximum spectral power will match that required for coding the appropriate bit value is 0.25. Therefore, 25% of the blocks, on an average, would be auto-coded. This type of coding will significantly decrease code audibility.

A practical problem associated with block coding by either amplitude or phase modulation of the type described above is that large discontinuities in the audio signal can arise at a boundary between successive blocks. These sharp transitions can render the code audible. In order to eliminate these sharp transitions, the time-domain signal v(t) can be multiplied by a smooth envelope or window function w(t) at the step 42 prior to performing the Fourier Transform at the step 44. No window function is required for the modulation by frequency swapping approach described herein. The frequency distortion is usually small enough to produce only minor edge discontinuities in the time domain between adjacent blocks.

Figure 4:
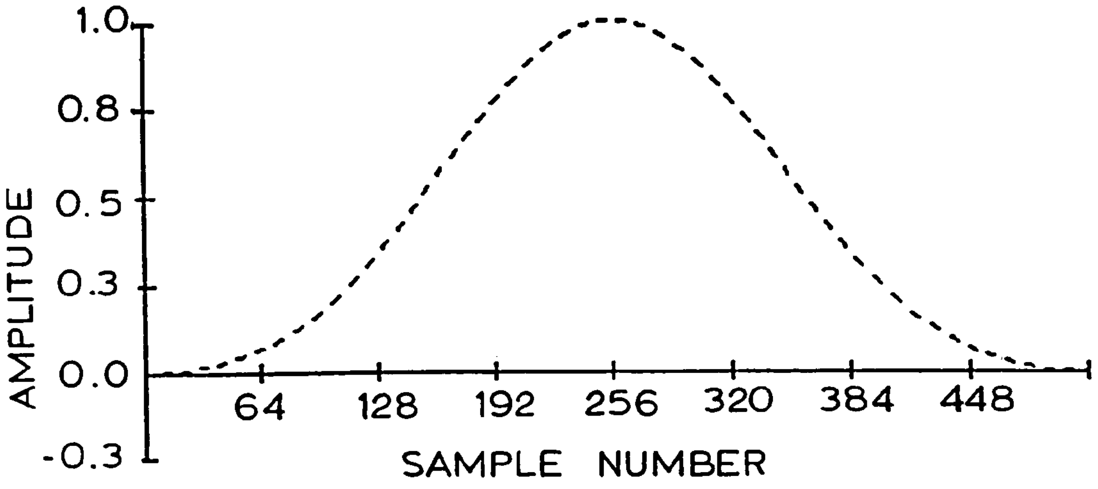
FIG. 4 depicts a window function which may be used to prevent transient effects that might otherwise occur at the boundaries between adjacent encoded blocks.

The window function w(t) is depicted in FIG. 4. Therefore, the analysis performed at the step 54 is limited to the central section of the block resulting from $\mathfrak{F}_m\{v(t)w(t)\}$. The required spectral modulation is implemented at the step 56 on the transform $\mathfrak{F}\{v(t)w(t)\}$.

The modified frequency spectrum which now contains the binary code (either '0' or '1') is subjected to an inverse transform operation at a step 62 in order to obtain the encoded time domain signal, as will be discussed below. Following the step 62, the coded time domain signal is determined at a step 64 according to the following equation:

$$v_0(t)=v(t)+(\mathfrak{F}_m^{-1}(v(t)w(t))-v(t)w(t)) \tag{13}$$

where the first part of the right hand side of equation (13) is the original audio signal v(t), where the second part of the right hand side of equation (13) is the encoding, and where the left hand side of equation (13) is the resulting encoded audio signal $v_0(t)$.

Figure 5:
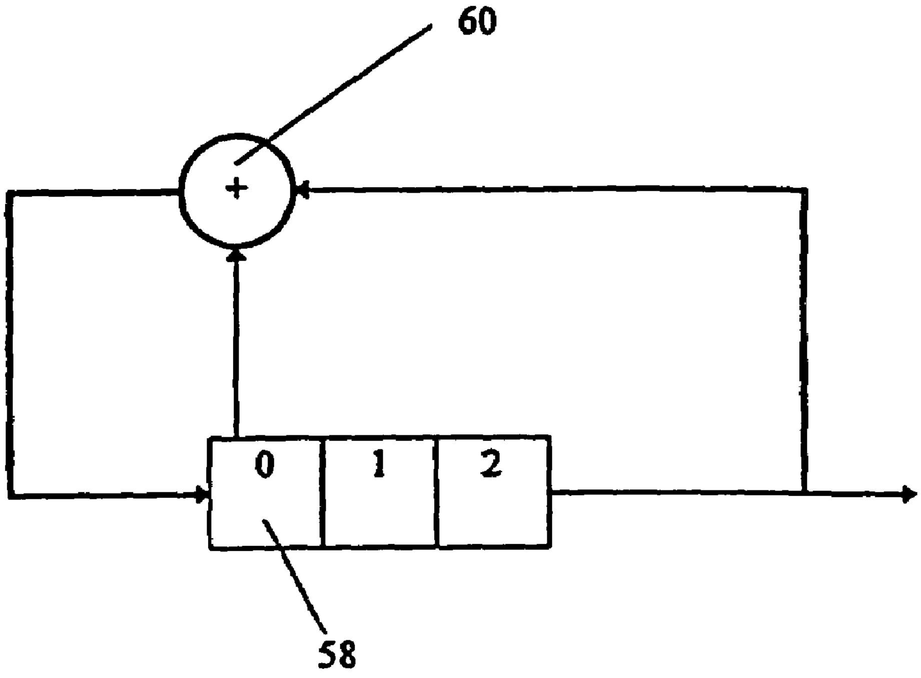
FIG. 5 is a schematic block diagram of an arrangement for generating a seven-bit pseudo-noise synchronization sequence.

While individual bits of the "robust" ancillary code can be coded by the method described thus far, practical decoding of digital data also requires (i) synchronization, so as to locate the start of data, and (ii) built-in error correction, so as to provide for reliable data reception. The raw bit error rate resulting from coding by spectral modulation is high and can typically reach a value of 20%. In the presence of such error rates, both synchronization and error-correction may be achieved by using pseudo-noise (PN) sequences of ones and zeroes. A PN sequence can be generated, for example, by using an m-stage shift register 58 (where m is three in the case of FIG. 5) and an exclusive-OR gate 60 as shown in FIG. 5. For convenience, an n-bit PN sequence is referred to herein as a PNn sequence. For an $N_{PN}$ bit PN sequence, an m-stage shift register is required operating according to the following equation:

$$N_{PN}=2^m-1 \tag{14}$$

where m is an integer. With m=3, for example, the 7-bit PN sequence (PN7) is 1110100. The particular sequence depends upon an initial setting of the shift register 58. In one robust version of the encoder 12, each individual bit of code data is represented by this PN sequence—i.e., 1110100 is used for a bit '1,' and the complement 0001011 is used for a bit '0.' The use of seven bits to code each bit of code results in extremely high coding overheads.

An alternative method uses a plurality of PN15 sequences, each of which includes five bits of code data and 10 appended error correction bits. This representation provides a Hamming distance of 7 between any two 5-bit code data words. Up to three errors in a fifteen bit sequence can be detected and corrected. This PN15 sequence is ideally suited for a channel with a raw bit error rate of 20%.

Figure 6:
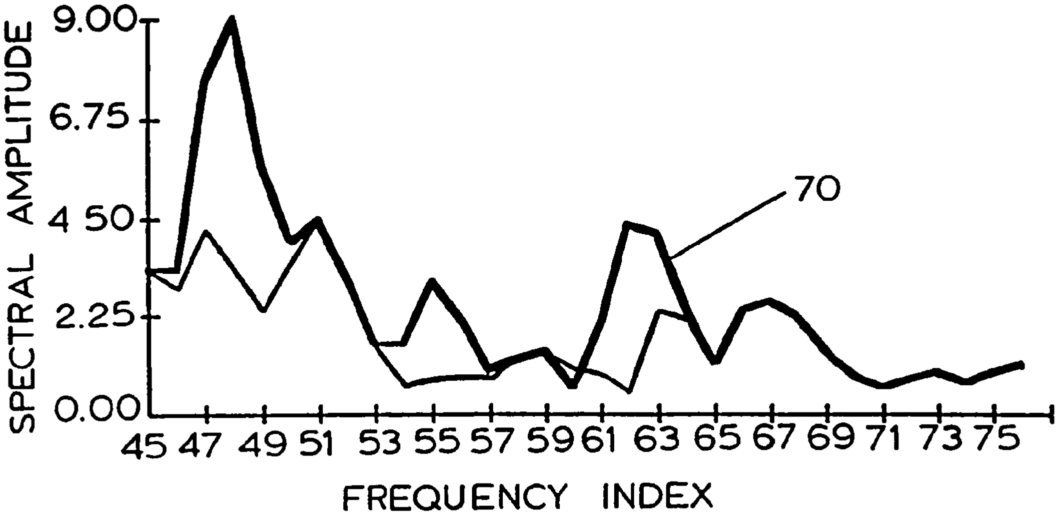
FIG. 6 is a spectral plot of a "triple tone" audio block which forms the first block of a preferred synchronization sequence, where the thin line of the plot is the spectrum of the original audio signal and the thick line of the plot is the spectrum of the modulated signal.

In terms of synchronization, a unique synchronization sequence 66 (FIG. 7*a*) is required for synchronization in order to distinguish PN15 code bit sequences 74 from other bit sequences in the coded data stream. In a preferred embodiment shown in FIG. 7*b*, the first code block of the synchronization sequence 66 uses a "triple tone" 70 of the synchronization sequence in which three frequencies with indices $I_0$, $I_1$, and $I_{mid}$ are all amplified sufficiently that each becomes a maximum in its respective neighborhood, as depicted by way of example in FIG. 6. Although it is preferred to generate the triple tone 70 by amplifying the signals at the three selected frequencies to be relative maxima in their respective frequency neighborhoods, those signals could instead be locally attenuated so that the three associated local extreme values comprise three local minima. Alternatively, any combination of local maxima and local minima could be used for the triple tone 70. However, because program audio signals include substantial periods of silence, the preferred approach involves local amplification rather than local attenuation. Being the first bit in a sequence, the hop sequence value for the block from which the triple tone 70 is derived is two and the mid-frequency index is fifty-five. In order to make the triple tone block truly unique, a shift index of seven may be chosen instead of the usual five. The three indices $I_0/I_1$, and $I_{mid}$ whose amplitudes are all amplified are forty-eight, sixty-two and fifty-five as shown in FIG. 6. (In this example, $I_{mid}=H_S+53=2+53=55$.) The triple tone 70 is the first block of the fifteen block sequence 66 and essentially represents one bit of synchronization data. The remaining fourteen blocks of the synchronization sequence 66 are made up of two PN7 sequences: 1110100, 0001011. This makes the fifteen synchronization blocks distinct from all the PN sequences representing code data.

Figure 7A:
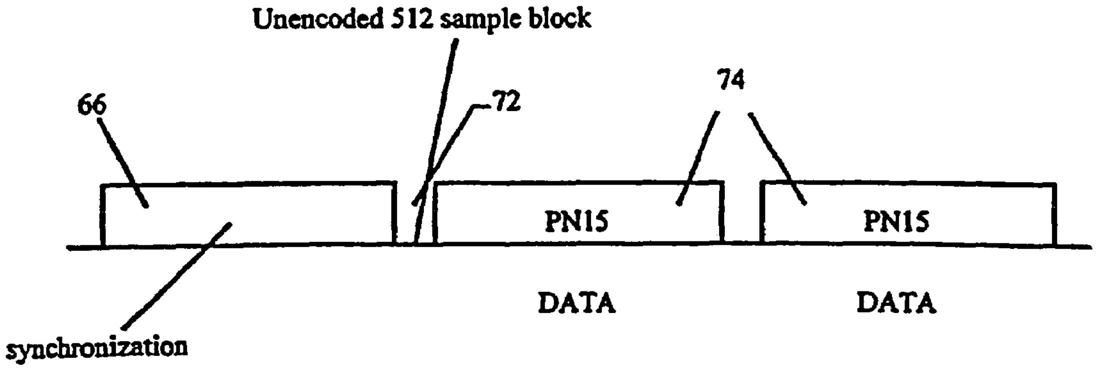
FIG. 7*a* schematically depicts an arrangement of synchronization and information blocks usable to form a complete code message.
Figure 7B:
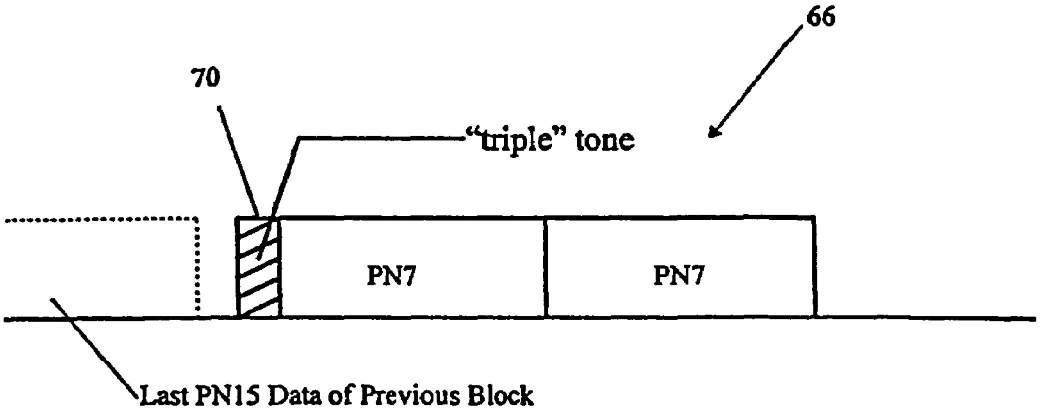
FIG. 7*b* schematically depicts further details of the synchronization block shown in FIG. 7*a*; and, FIG. 8 is a flow chart depicting steps performed by a decoder of the system shown in FIG. 1.

As stated earlier, the code data to be transmitted is converted into five bit groups, each of which is represented by a PN15 sequence. As shown in FIG. 7*a*, an unencoded block 72 is inserted between each successive pair of PN sequences 74. During decoding, this unencoded block 72 (or gap) between neighboring PN sequences 74 allows precise synchronizing by permitting a search for a correlation maximum across a range of audio samples.

In the case of stereo signals, the left and right channels are encoded with identical digital data. In the case of mono signals, the left and right channels are combined to produce a single audio signal stream. Because the frequencies selected for modulation are identical in both channels, the resulting monophonic sound is also expected to have the desired spectral characteristics so that, when decoded, the same digital code is recovered.

Entropy Encoding

In order to avoid the use of a "fragile" ancillary code in the detection of unauthorized compression/decompression of the audio signal 14, the audio signal 14 is encoded with the entropy of a portion of the audio signal 14. The entropy of this portion of the audio signal 14 may be calculated by sampling the appropriate portion of the audio signal 14 at a sampling rate A producing a number samples B over a length of time C. For example, the sampling rate A may be 48 kHz, the resulting number of samples B may be 8192, and the length of time C may be approximately 170.666 milliseconds. The 8192 samples are normalized so that each has a decimal value of between 0 and 255.

A histogram is formed by placing each of the 8192 samples in a bin according to its value. Thus, there 256 bins (0 to 255) with each of the bins containing a number of samples depending upon how many of the 8192 samples have a value corresponding to that bin. The entropy of this portion of the audio signal 14 is then determined according to the following equation:

$$E=-\sum_{i=0}^{255} p_i \log p_i \tag{15}$$

where the probability $p_i$ in equation (15) is determined as the number of samples in bin i divided by the total number of samples (i.e., 8192, in the above example). The decimal number resulting from equation (15) is multiplied by D and is expressed as an E bit integer. The values for D and E may be any suitable numbers such as 1000 and 13 respectively.

Each bit of the entropy E is then encoded into the audio signal 14 using any suitable coding technique, such as any of the coding techniques discussed above. Accordingly, the calculated entropy is inserted into the audio signal 14 as an entropy ancillary code that is "robust." However, other methods of inserting the calculated entropy into the audio signal may be employed.

Also, the calculated entropy may be encoded into the audio signal 14 beginning at a predetermined time following the synchronization sequence that triggered the entropy calculation. Accordingly, the encoded entropy is easily found by the decoder 26. For example, the entropy E may be encoded into the audio signal 14 beginning at the portion of the audio signal 14 from which the entropy calculation of equation (15) was made. Alternatively, as described immediately below, the entropy E could be encoded into the audio signal 14 with another "robust" code.

If a thirteen-bit entropy ancillary code is transmitted with a twelve-bit ancillary code as discussed in the background section of this document, both ancillary codes may be appended together forming a 25-bit data packet. This 25-bit data packet is encoded as five data sequences. Each data sequence carries five bits of ancillary code information and ten bits of error correction so as to form a fifteen-bit data sequence. Moreover, the first data sequence contains the first five bits of the twelve-bit ancillary code. While encoding the corresponding section of the audio signal 14 with this first data sequence, the entropy of the audio signal is computed in order to generate the thirteen-bit entropy value for insertion into the third, fourth and fifth data sequences. The third data sequence contains two bits of the first ancillary code and three bits of the entropy number. These five data sequences may be inserted following insertion of the synchronization sequence so that the 25-bit combined ancillary code can be easily found by the decoder 26.

Alternatively, it is possible to transmit the entropy ancillary code without appending it to another code. In this case, the entropy ancillary code could be expanded or contracted in any desirable fashion to produce a number of bits divisible by five so that the entropy ancillary code can be transmitted as an appropriate number of PN15 sequences.

Moreover, if one of the coding techniques discussed above is used to encode the audio signal 14 with the calculated entropy E, the entropy of the encoded portion of the audio signal 14 is preserved, which could be important for proper operation of the decoder 26.

Decoding the Spectrally Modulated Signal

The embedded ancillary code(s) are recovered by the decoder 26. The decoder 26, if necessary, converts the analog audio to a sampled digital output stream at a preferred sampling rate matching the sampling rate of the encoder 12. In decoding systems where there are limitations in terms of memory and computing power, a half-rate sampling could be used. In the case of half-rate sampling, each code block would consist of $N_C/2=256$ samples, and the resolution in the frequency domain (i.e., the frequency difference between successive spectral components) would remain the same as in the full sampling rate case. In the case where the receiver 20 provides digital outputs, the digital outputs are processed directly by the decoder 26 without sampling but at a data rate suitable for the decoder 26.

The task of decoding is primarily one of matching the decoded data bits with those of a PN15 sequence which could be either a synchronization sequence or a code data sequence representing one or more code data bits. The case of amplitude modulated audio blocks is considered here. However, decoding of phase modulated blocks is virtually identical, except for the spectral analysis, which would compare phase angles rather than amplitude distributions, and decoding of index modulated blocks would similarly analyze the parity of the frequency index with maximum power in the specified neighborhood. Audio blocks encoded by frequency swapping can also be decoded by the same process.

In a practical implementation of audio decoding, such as may be used in a home audience metering system, the ability to decode an audio stream in real-time is highly desirable. The decoder 26 may be arranged to run the decoding algorithm described below on Digital Signal Processing (DSP) based hardware typically used in such applications. As disclosed above, the incoming encoded audio signal may be made available to the decoder 26 from either the audio output 28 or from the microphone 30 placed in the vicinity of the speakers 24. In order to increase processing speed and reduce memory requirements, the decoder 26 may sample the incoming encoded audio signal at half (24 kHz) of the normal 48 kHz sampling rate.

Before recovering the actual data bits representing code information, it is necessary to locate the synchronization sequence. In order to search for the synchronization sequence within an incoming audio stream, blocks of 256 samples, each consisting of the most recently received sample and the 255 prior samples, could be analyzed. For real-time operation, this analysis, which includes computing the Fast Fourier Transform of the 256 sample block, has to be completed before the arrival of the next sample. Performing a 256-point Fast Fourier Transform on a 40 MHZ DSP processor takes about 600 microseconds. However, the time between samples is only 40 microseconds, making real time processing of the incoming coded audio signal as described above impractical with current hardware.

Therefore, instead of computing a normal Fast Fourier Transform on each 256 sample block, the decoder 26 may be arranged to achieve real-time decoding by implementing an incremental or sliding Fast Fourier Transform routine 100 (FIG. 8) coupled with the use of a status information array SIS that is continuously updated as processing progresses. This array comprises p elements SIS[0] to SIS[p−1]. If p=64, for example, the elements in the status information array SIS are SIS[0] to SIS[63].

Moreover, unlike a conventional transform which computes the complete spectrum consisting of 256 frequency "bins," the decoder 26 computes the spectral amplitude only at frequency indexes that belong to the neighborhoods of interest, i.e., the neighborhoods used by the encoder 12. In a typical example, frequency indexes ranging from 45 to 70 are adequate so that the corresponding frequency spectrum contains only twenty-six frequency bins. Any code that is recovered appears in one or more elements of the status information array SIS as soon as the end of a message block is encountered.

Additionally, it is noted that the frequency spectrum as analyzed by a Fast Fourier Transform typically changes very little over a small number of samples of an audio stream. Therefore, instead of processing each block of 256 samples consisting of one "new" sample and 255 "old" samples, 256 sample blocks may be processed such that, in each block of 256 samples to be processed, the last k samples are "new" and the remaining 256-k samples are from a previous analysis. In the case where k=4, processing speed may be increased by skipping through the audio stream in four sample increments, where a skip factor k is defined as k=4 to account for this operation.

Each element SIS[p] of the status information array SIS consists of five members: a previous condition status PCS, a next jump index JI, a group counter GC, a raw data array DA, and an output data array OP. The raw data array DA has the capacity to hold fifteen integers. The output data array OP stores ten integers, with each integer of the output data array OP corresponding to a five bit number extracted from a recovered PN15 sequence. This PN15 sequence, accordingly, has five actual data bits and ten other bits. These other bits may be used, for example, for error correction. It is assumed here that the useful data in a message block consists of 50 bits divided into 10 groups with each group containing 5 bits, although a message block of any size may be used.

Figure 8:
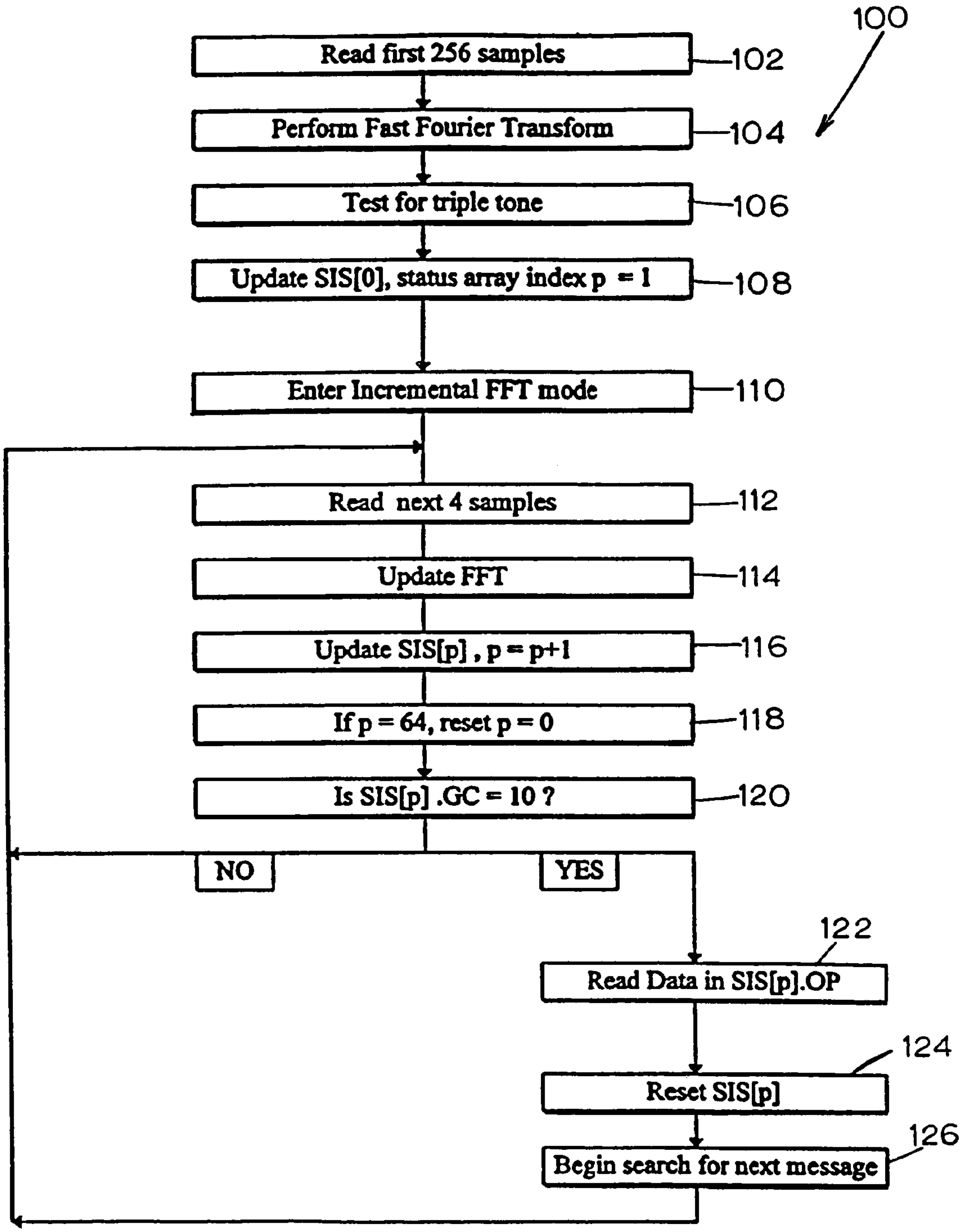

The operation of the status information array SIS is best explained in connection with FIG. 8. An initial block of 256 samples of received audio is read into a buffer at a processing stage 102. The initial block of 256 samples is analyzed at a processing stage 104 by a conventional Fast Fourier Transform to obtain its spectral power distribution. All subsequent transforms implemented by the routine 100 use the high-speed incremental approach referred to above and described below.

In order to first locate the synchronization sequence, the Fast Fourier Transform corresponding to the initial 256 sample block read at the processing stage 102 is tested at a processing stage 106 for a triple tone, which represents the first bit in the synchronization sequence. The presence of a triple tone may be determined by examining the initial 256 sample block for the indices $I_0$, $I_1$, and $I_{mid}$ used by the encoder 12 in generating the triple tone, as described above. The SIS[p] element of the SIS array that is associated with this initial block of 256 samples is SIS[0], where the status array index p is equal to 0. If a triple tone is found at the processing stage 106, the values of certain members of the SIS[0] element of the status information array SIS are changed at a processing stage 108 as follows: the previous condition status PCS, which is initially set to 0, is changed to a 1 indicating that a triple tone was found in the sample block corresponding to SIS[0]; the value of the next jump index JI is incremented to 1; and, the first integer of the raw data member DA[0] in the raw data array DA is set to the value (0 or 1) of the triple tone. In this case, the first integer of the raw data member DA[0] in the raw data array DA is set to 1 because it is assumed in this analysis that the triple tone is the equivalent of a 1 bit. Also, the status array index p is incremented by one for the next sample block. If there is no triple tone, none of these changes in the SIS[0] element are made at the processing stage 108, but the status array index p is still incremented by one for the next sample block. Whether or not a triple tone is detected in this 256 sample block, the routine 100 enters an incremental FFT mode at a processing stage 110.

Accordingly, a new 256 sample block increment is read into the buffer at a processing stage 112 by adding four new samples to, and discarding the four oldest samples from, the initial 256 sample block processed at the processing stages 102-106. This new 256 sample block increment is analyzed at a processing stage 114 according to the following steps:

STEP 1: the skip factor k of the Fourier Transform is applied according to the following equation in order to modify each frequency component $F_{old}(u_0)$ of the spectrum corresponding to the initial sample block in order to derive a corresponding intermediate frequency component $F_1(u_0)$:

$$F_1(u_0) = F_{old}(u_0)\exp-\left(\frac{2\pi u_0 k}{256}\right) \tag{16}$$

where $u_0$ is the frequency index of interest. In accordance with the typical example described above, the frequency index $u_0$ varies from 45 to 70. It should be noted that this first step involves multiplication of two complex numbers.

STEP 2: the effect of the first four samples of the old 256 sample block is then eliminated from each $F_1(u_0)$ of the spectrum corresponding to the initial sample block and the effect of the four new samples is included in each $F_1(u_0)$ of the spectrum corresponding to the current sample block increment in order to obtain the new spectral amplitude $F_{new}(u_0)$ for each frequency index $u_0$ according to the following equation:

$$F_{new}(u_0) = F_l(u_0) + \sum_{m=1}^{m=4}(f_{new}(m) - f_{old}(m))\exp-\left(\frac{2\pi u_0(k-m+1)}{256}\right) \tag{17}$$

where $f_{old}$ and $f_{new}$ are the time-domain sample values. It should be noted that this second step involves the addition of a complex number to the summation of a product of a real number and a complex number. This computation is repeated across the frequency index range of interest (for example, 45 to 70).

STEP 3: the effect of the multiplication of the 256 sample block by the window function in the encoder 12 is then taken into account. That is, the results of step 2 above are not confined by the window function that is used in the encoder 12. Therefore, the results of step 2 preferably should be multiplied by this window function. Because multiplication in the time domain is equivalent to a convolution of the spectrum by the Fourier Transform of the window function, the results from the second step may be convolved with the window function. In this case, the preferred window function for this operation is the following well known "raised cosine" function which has a narrow 3-index spectrum with amplitudes (−0.50, 1, +0.50):

$$w(t) = \frac{1}{2}\left[1 - \cos\left(\frac{2\pi t}{T_W}\right)\right] \tag{18}$$

where $T_W$ is the width of the window in the time domain. This "raised cosine" function requires only three multiplication and addition operations involving the real and imaginary parts of the spectral amplitude. This operation significantly improves computational speed. This step is not required for the case of modulation by frequency swapping.

STEP 4: the spectrum resulting from step 3 is then examined for the presence of a triple tone. If a triple tone is found, the values of certain members of the SIS[1] element of the status information array SIS are set at a processing stage 116 as follows: the previous condition status PCS, which is initially set to 0, is changed to a 1; the value of the next jump index JI is incremented to 1; and, the first integer of the raw data member DA[1] in the raw data array DA is set to 1. Also, the status array index p is incremented by one. If there is no triple tone, none of these changes are made to the members of the structure of the SIS[1] element at the processing stage 116, but the status array index p is still incremented by one.

Because p is not yet equal to 64 as determined at a processing stage 118 and the group counter GC has not accumulated a count of 10 as determined at a processing stage 120, this analysis corresponding to the processing stages 112-120 proceeds in the manner described above in four sample increments where p is incremented for each sample increment. When SIS[63] is reached where p=64, p is reset to 0 at the processing stage 118 and the 256 sample block increment now in the buffer is exactly 256 samples away from the location in the audio stream at which the SIS[0] element was last updated. Each time p reaches 64, the SIS array represented by the SIS[0]-SIS[63] elements is examined to determine whether the previous condition status PCS of any of these elements is one indicating a triple tone. If the previous condition status PCS of any of these elements corresponding to the current 64 sample block increments is not one, the processing stages 112-120 are repeated for the next 64 block increments. (Each block increment comprises 256 samples.)

Once the previous condition status PCS is equal to 1 for any of the SIS[0]-SIS[63] elements corresponding to any set of 64 sample block increments, and the corresponding raw data member DA[p] is set to the value of the triple tone bit, the next 64 block increments are analyzed at the processing stages 112-120 for the next bit in the synchronization sequence.

Each of the new block increments beginning where p was reset to 0 is analyzed for the next bit in the synchronization sequence. This analysis uses the second member of the hop sequence $H_S$ because the next jump index JI is equal to 1. From this hop sequence number and the shift index used in encoding, the $I_1$ and $I_0$ indexes can be determined, for example from equations (2) and (3). Then, the neighborhoods of the $I_1$ and $I_0$ indexes are analyzed to locate maximums and minimums in the case of amplitude modulation. If, for example, a power maximum at $I_1$ and a power minimum at $I_0$ are detected, the next bit in the synchronization sequence is taken to be 1. In order to allow for some variations in the signal that may arise due to compression or other forms of distortion, the index for either the maximum power or minimum power in a neighborhood is allowed to deviate by 1 from its expected value. For example, if a power maximum is found in the index $I_1$, and if the power minimum in the index $I_0$ neighborhood is found at $I_0-1$, instead of $I_0$, the next bit in the synchronization sequence is still taken to be 1. On the other hand, if a power minimum at $I_1$ and a power maximum at $I_0$ are detected using the same allowable variations discussed above, the next bit in the synchronization sequence is taken to be 0. However, if none of these conditions are satisfied, the output code is set to −1, indicating a sample block that cannot be decoded. Assuming that a 0 bit or a 1 bit is found, the second integer of the raw data member DA[1] in the raw data array DA is set to the appropriate value, and the next jump index JI of SIS[0] is incremented to 2, which corresponds to the third member of the hop sequence $H_S$. From this hop sequence number and the shift index used in encoding, the $I_1$ and $I_0$ indexes can be determined. Then, the neighborhoods of the $I_1$ and $I_0$ indexes are analyzed to locate maximums and minimums in the case of amplitude modulation so that the value of the next bit can be decoded from the third set of 64 block increments, and so on for fifteen such bits of the synchronization sequence. The fifteen bits stored in the raw data array DA may then be compared with a reference synchronization sequence to determine synchronization. If the number of errors between the fifteen bits stored in the raw data array DA and the reference synchronization sequence exceeds a previously set threshold, the extracted sequence is not acceptable as a synchronization, and the search for the synchronization sequence begins anew with a search for a triple tone.

If a valid synchronization sequence is thus detected, there is a valid synchronization, and the PN15 data sequences may then be extracted using the same analysis as is used for the synchronization sequence, except that detection of each PN15 data sequence is not conditioned upon detection of the triple tone which is reserved for the synchronization sequence. As each bit of a PN15 data sequence is found, it is inserted as a corresponding integer of the raw data array DA. When all integers of the raw data array DA are filled, (i) these integers are compared to each of the thirty-two possible PN15 sequences, (ii) the best matching sequence indicates which 5-bit number to select for writing into the appropriate array location of the output data array OP, and (iii) the group counter GC member is incremented to indicate that the first PN15 data sequence has been successfully extracted. If the group counter GC has not yet been incremented to 10 as determined at the processing stage 120, program flow returns to the processing stage 112 in order to decode the next PN15 data sequence.

When the group counter GC has incremented to 10 as determined at the processing stage 120, the output data array OP, which contains a full 50-bit message, is read at a processing stage 122. The total number of samples in a message block is 45,056 at a half-rate sampling frequency of 24 kHz. It is possible that several adjacent elements of the status information array SIS, each representing a message block separated by four samples from its neighbor, may lead to the recovery of the same message because synchronization may occur at several locations in the audio stream which are close to one another. If all these messages are identical, there is a high probability that an error-free code has been received.

Once a message has been recovered and the message has been read at the processing stage 122, the previous condition status PCS of the corresponding SIS element is set to 0 at a processing stage 124 so that searching is resumed at a processing stage 126 for the triple tone of the synchronization sequence of the next message block.

Entropy Detection and Use

The entropy ancillary code encoded into the audio signal 14 by the encoder 12 either alone or with another ancillary code is decoded by the decoder 26 using, for example, the decoding techniques described above. The decoded entropy may be used, for example, to determine if the audio signal 14 has undergone compression/decompression.

In order to detect compression/decompression, which reduces the entropy of an audio signal, the decoder 26, besides decoding the entropy ancillary code, uses equation (15) to calculate the entropy of the same portion of the audio signal 14 that was used by the encoder 12 to make the entropy calculation described above. For this purpose, the decoder 26 may calculate entropy in the same way that the encoder 12 calculates entropy. For example, if the thirteen-bit entropy ancillary code is appended to the twelve-bit ancillary code as discussed above, the decoder 26 can determine the appropriate portion of the audio signal 14 from which it can also compute entropy only after it has successfully recovered the synchronization sequence, unless the decoder 26 continuously computes the entropy of the sixteen blocks preceding the current location of the analysis.

Once the decoder 26 has decoded the entropy ancillary code and has made its own calculation of the entropy of the audio signal 14, it compares the entropy that it calculates to the entropy contained in the entropy ancillary code as decoded from the audio signal 14. If these entropies differ by more than a predetermined amount, the decoder 26 can conclude that the audio signal 14 has undergone compression/decompression. Accordingly, if the decoder 26 concludes that the audio signal 14 has undergone compression/decompression, decoder 26 may be arranged to take some action such as controlling the receiver 20 in a predetermined manner. For example, if the receiver 20 is a player, the decoder 26 may be arranged to prevent the player from playing the audio signal 14.

Certain modifications of the present invention have been discussed above. Other modifications will occur to those practicing in the art of the present invention. For example, the invention has been described above in connection with the transmission of an encoded signal from the transmitter 16 to the receiver 20. Alternatively, the present invention may be used in connection with other types of systems. For example, the transmitter 16 could instead be a recording device arranged to record the encoded signal on a medium, and the receiver 20 could instead be a player arranged to play the encoded signal stored on the medium. As another example, the transmitter 16 could instead be a server, such as a web site, and the receiver 20 could instead be a computer or other web compliant device coupled-over a network, such as the Internet, to the server in order to download the encoded signal.

Also, as described above, coding a signal with a "1" bit using amplitude modulation involves boosting the frequency $f_1$ and attenuating the frequency $f_0$, and coding a signal with a "0" bit using amplitude modulation involves attenuating the frequency $f_1$ and boosting the frequency $f_0$. Alternatively, coding a signal with a "1" bit using amplitude modulation could instead involve attenuating the frequency $f_1$ and boosting the frequency $f_0$, and coding a signal with a "0" bit using amplitude modulation could involve boosting the frequency $f_1$ and attenuating the frequency $f_0$.

Moreover, the entropy of the audio signal 14 is calculated using equation (15) as described above. Instead, the entropy of a signal, which is a measure of the energy of the signal, can be calculated using other approaches.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A decoder having an input and an output, wherein the input receives a signal, which includes an encoded entropy value, wherein the decoder decodes the signal to read the encoded entropy value from the signal, and wherein the output carries a signal based upon the encoded entropy value, and wherein the decoder is configured to calculate an entropy of the signal and compare the calculated entropy to the encoded entropy value.

2. The decoder of claim 1 wherein the decoder is configured to detect at least one of a compression operation or a decompression operation based on the comparison.

3. The decoder of claim 1 wherein the decoder is configured to prevent use of a device based on the comparison.

4. The decoder of claim 1 wherein the decoder is configured to calculate the entropy of the signal based on a sum of probabilities.

5. A method of decoding a signal, which includes a first calculated entropy value, the method comprising:

decoding the signal to extract an ancillary code representing the first calculated entropy value from the signal;

calculating a second entropy of the signal;

comparing the second calculated entropy of the signal to the first calculated entropy value; and providing an output based on the comparison of the second calculated entropy of the signal to the first calculated entropy value.

6. The method of claim 5 wherein the signal is an audio signal.

7. The method of claim 5 wherein the first calculated entropy value is based on a sum of probabilities.

8. The method of claim 5 wherein decoding the signal comprises decoding the signal by amplitude demodulating pairs of frequencies.

9. The method of claim 5 wherein decoding the signal comprises determining swapping events that correspond to swapping of a spectral amplitude of at least two frequencies in the signal.

10. The method of claim 5 wherein decoding the signal comprises using frequency hopping.

11. The method of claim 5 wherein decoding the signal comprises using spectral demodulation.

12. The method of claim 5 wherein the output prevents playing of the signal.

13. The method of claim 5 wherein the entropy of the signal is based on a sum of probabilities.

* * * * *